United States Patent [19]
Miyashita et al.

[11] Patent Number: 5,227,820
[45] Date of Patent: Jul. 13, 1993

[54] SHADING DEVICE OF THE LCD PROJECTING PLATE

[75] Inventors: Kazuhiro Miyashita; Chia-Chen Liao; Chien-Chung Chang, all of Hsinchu, Taiwan

[73] Assignee: CTX-Electronics Corporation, Hsinchu, Taiwan

[21] Appl. No.: 890,862

[22] Filed: Jun. 1, 1992

[51] Int. Cl.$^5$ ............................................. G03B 21/14
[52] U.S. Cl. ..................................... 353/122; 353/97; 353/DIG. 5
[58] Field of Search ............... 353/97, 92, 88, DIG. 3, 353/DIG. 5, 120, 122, 121

[56] References Cited
U.S. PATENT DOCUMENTS

| | | | |
|---|---|---|---|
| 5,076,543 | 12/1991 | Mandai | 353/DIG. 5 |
| 5,120,125 | 6/1992 | Behr | 353/122 |
| 5,121,984 | 6/1992 | Jones et al. | 353/122 |

*Primary Examiner*—William A. Cuchlinski, Jr.
*Assistant Examiner*—William C. Dowling
*Attorney, Agent, or Firm*—Morton J. Rosenberg; David I. Klein

[57] ABSTRACT

A shading device of LCD projecting plate has a pair of shading board being capable of being adjusted to shade the rest projecting areas which are uncovered by the plate and to project the drawing or letters on the optical glass to a wall or a screen clearly whenever used with any projectors.

1 Claim, 8 Drawing Sheets

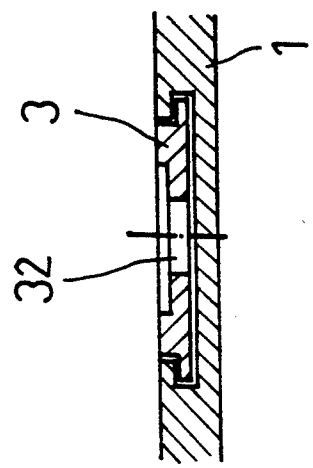
3-2
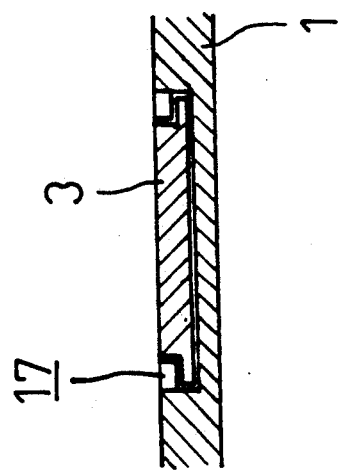
3-1

SHADING DEVICE OF THE LCD PROJECTING PLATE

BACKGROUND OF THE INVENTION

1. Field of the Invention

This invention pertains to LCD projecting plates which are generally coupled to a computer system and show drawing, letters, designs or other indicia on its optical glass. Such projecting plates are placed on a projector and the drawing or letters are projected on a wall or a screen for a large grouping of people to view the projected indicia.

2. Prior Art

Prior art LCD projecting plates are generally produced having a fixed configuration and are generally of uniform dimensional size. However, numerous types of known projectors may have differently sized projecting planes. When prior art LCD projecting plates are placed on a projector which has a greater dimensional projecting area than the size of the projecting plate, light from the projector passes through the projecting plate as well as from areas surrounding the projecting plate as is seen in FIG. 5. Due to the surrounding light areas, the projecting effect of the drawing, design, letters or indicia on the projecting plate will be diminished for the viewers.

SUMMARY OF THE INVENTION

It is the main objective of the present invention to mitigate and/or obviate the previously described disadvantages in the manner set forth in the Description of the Preferred Embodiments.

A primary object of the present invention is to provide a shading device for an LCD projecting plate which has a pair of shading boards capable of being adjusted to shade the projecting areas left uncovered by the plate on a projection plane.

Another objective of the present invention is to provide an improved LCD projecting plate apparatus which can project the drawing, letters, indicia, or designs found on the optical glass to a wall or a screen in a clear manner whenever such is used with a wide variety of known projectors.

Further objectives and advantages of the present invention will become apparent as the following description proceeds and the features of novelty which is characterized in the claims annexed to and forming a part of this invention.

BRIEF DESCRIPTION OF THE DRAWINGS

FIG. 3-1 is a sectional view of the projection plate taken along the section lines 1—1 of FIG. 3;

FIG. 3-2 is a sectional view of the projection plate taken along the section lines 2—2 of FIG. 3;

DESCRIPTION OF THE PREFERRED EMBODIMENTS

Figure 1:
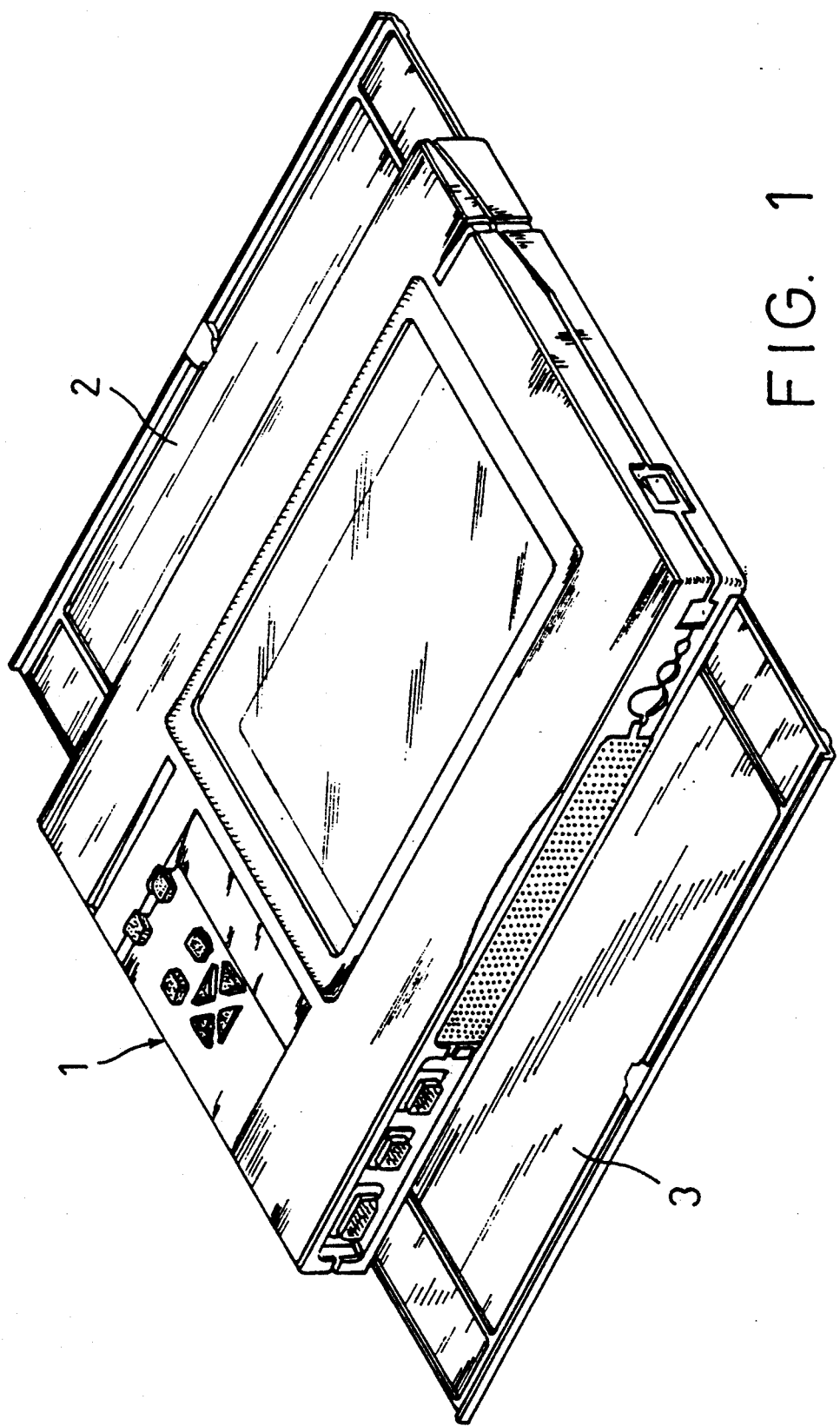
FIG. 1 is a perspective view of a projecting plate in accordance with the present invention concept.
Figure 2:
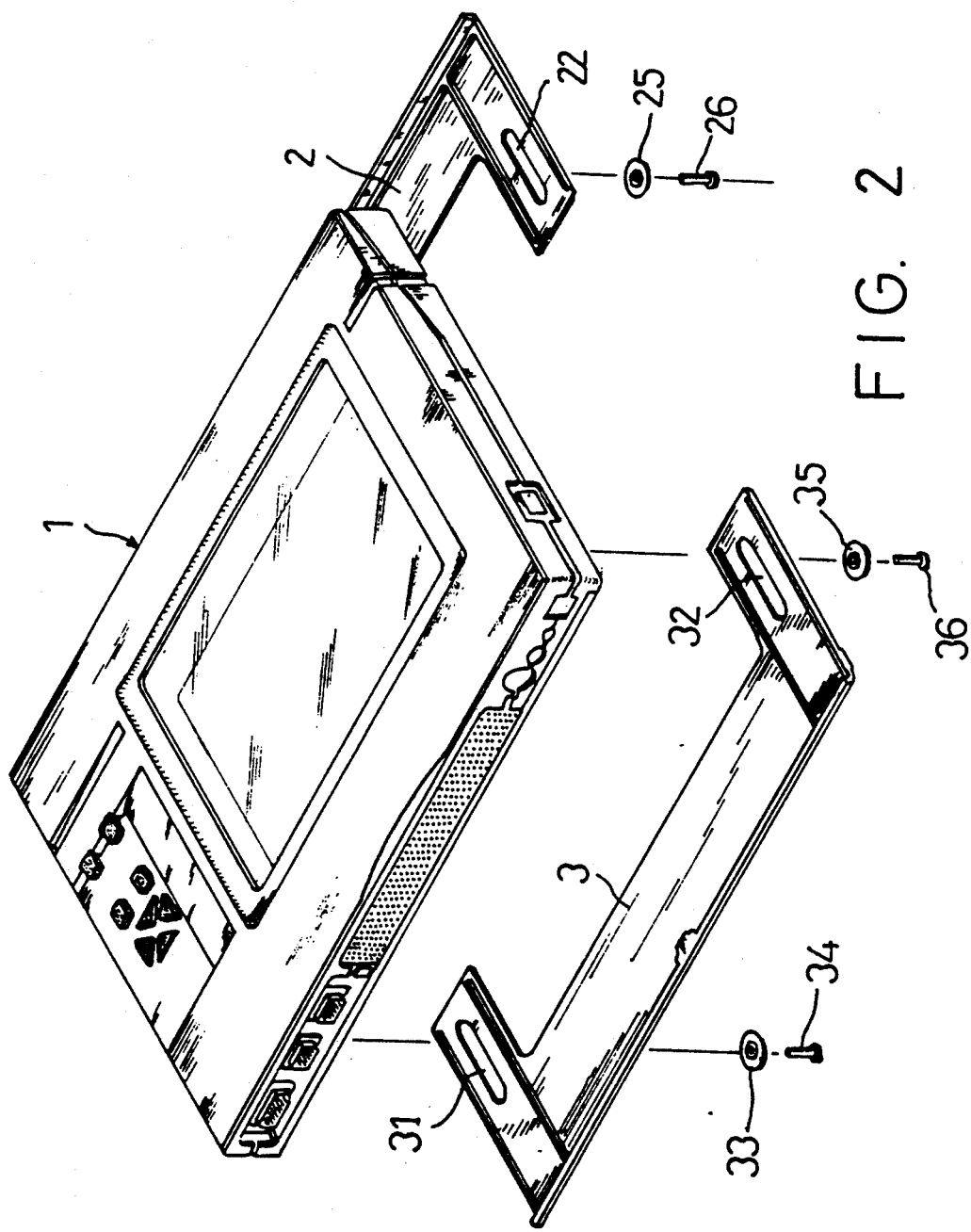
FIG. 2 is an exploded perspective view of FIG. 1 in accordance with the present invention concept.
Figure 3:
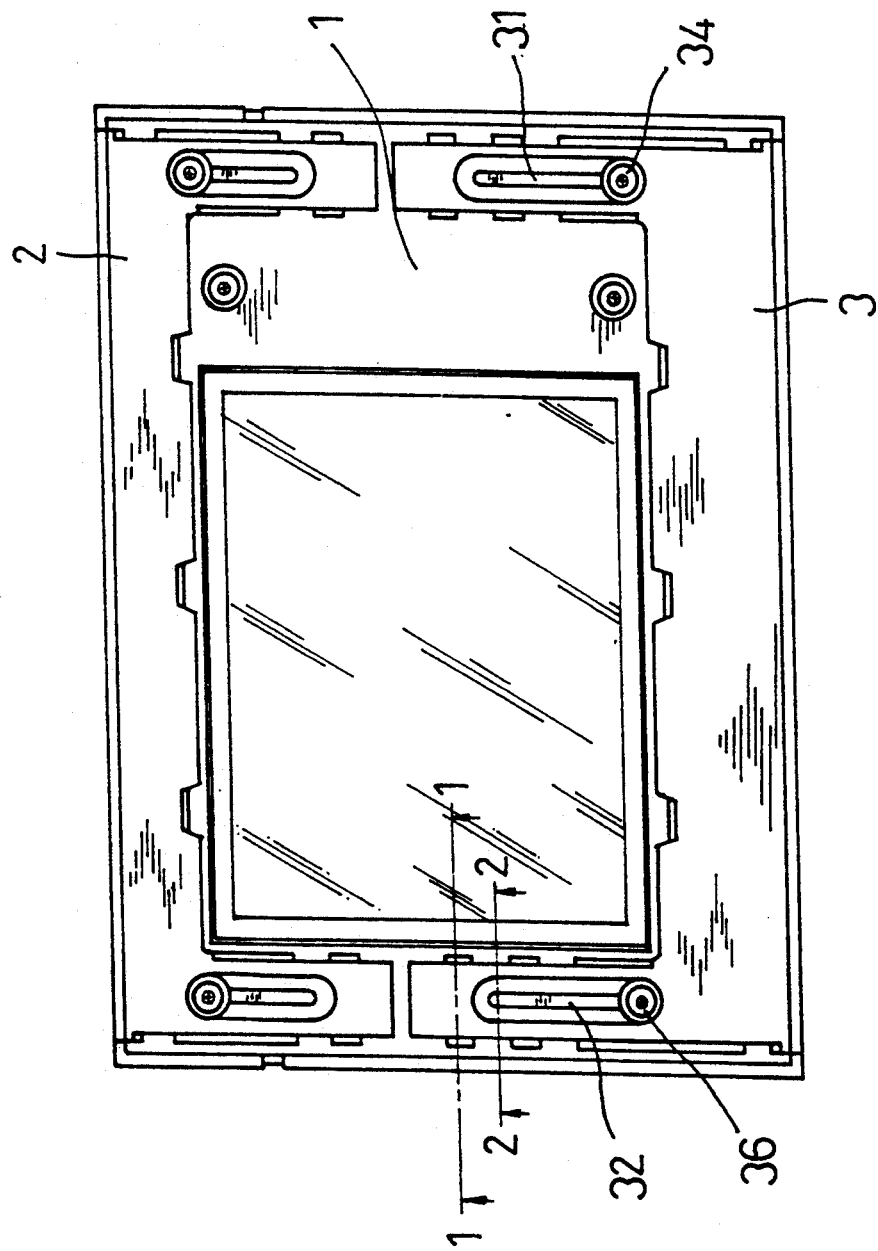
FIG. 3 is a bottom view of a projecting plate in accordance with the present invention concept.
Figure 4:
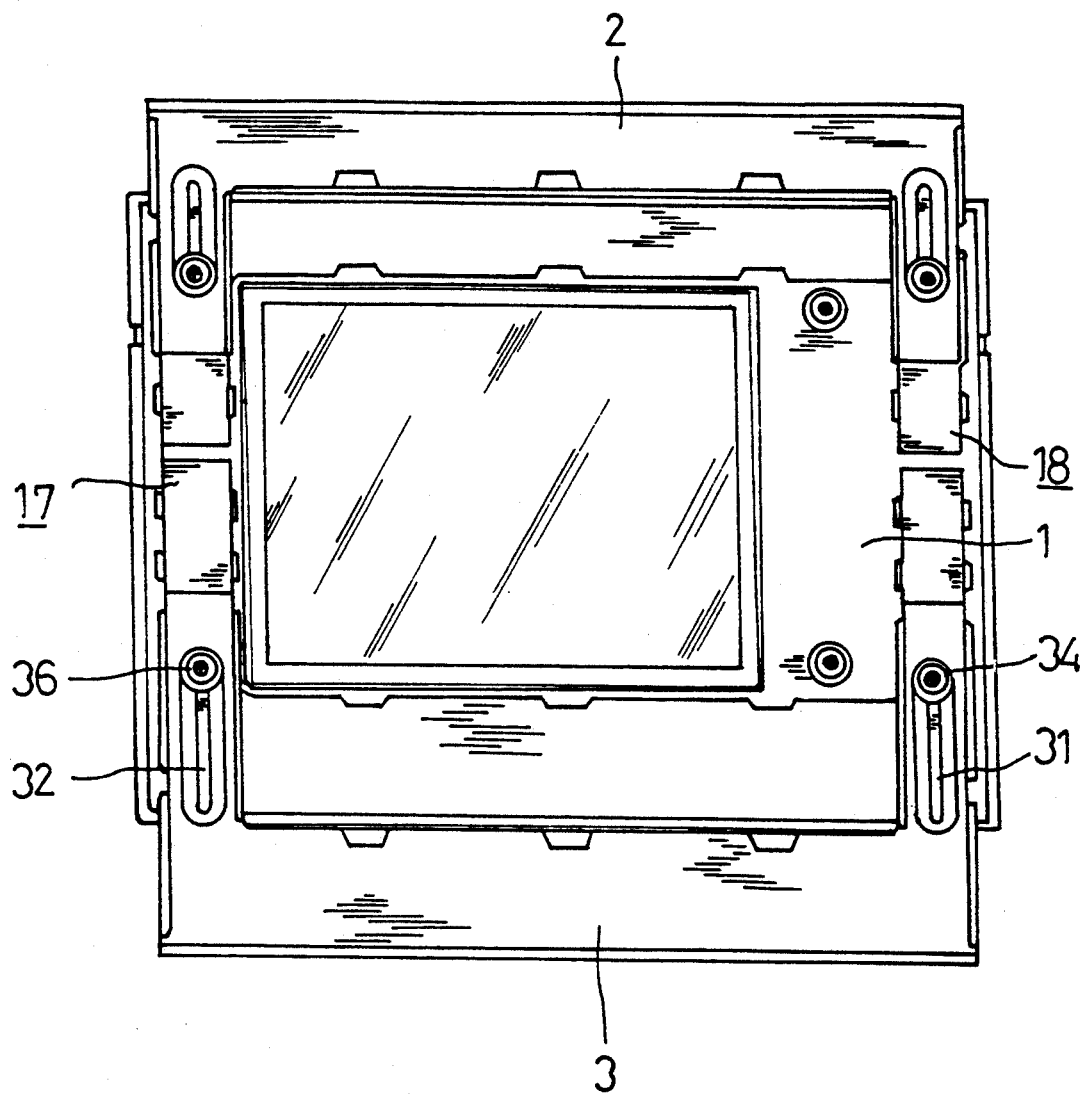
FIG. 4 is a bottom view of the shading device showing the shading boards extended in accordance with the present invention concept.

Referring to FIGS. 1–4, there is shown a projecting plate 1 and a pair of shading boards 2 and 3 which are slidably connected to the plate 1. The shading board 3 is formed in a generally U-shaped configuration having a pair of grooves or through openings 31 and 32 formed therethrough on opposing transverse and sections. Screws 34 and 36 with respective washers 33 and 35 extend through the grooves or through openings 31 and 32 of the shading board 3 and interface with a bottom portion of the plate 1. Plate 1 is provided with a pair of guideways 17 and 18 defining recesses for receiving and capturing the sides of the shading boards 2 and 3. The shading board 2 is of similar construction and configuration as defined for the shading board 3 and includes grooves or through openings 22, screws 26, and washers 25 for engaging with the plate 1 in a slidable manner.

Figure 5:
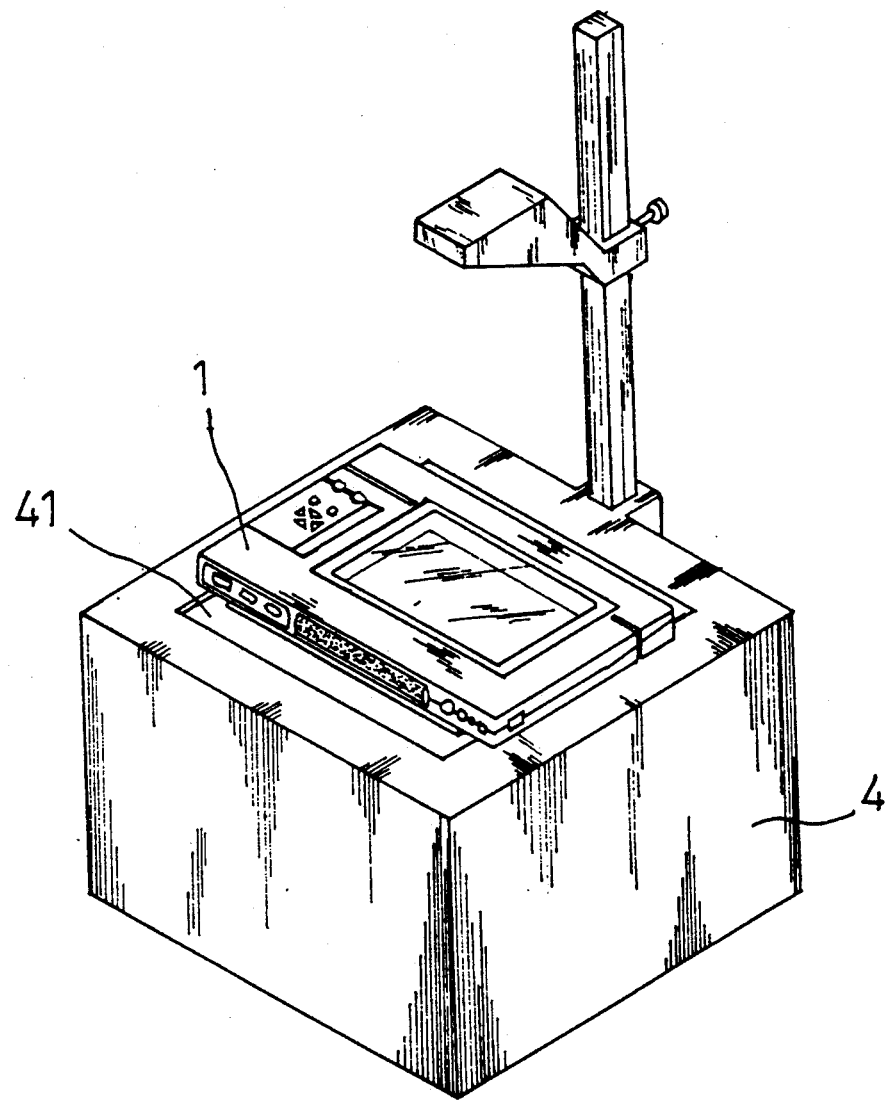
FIG. 5 is a perspective view of a projecting plate placed on a projector during operation.
Figure 6:
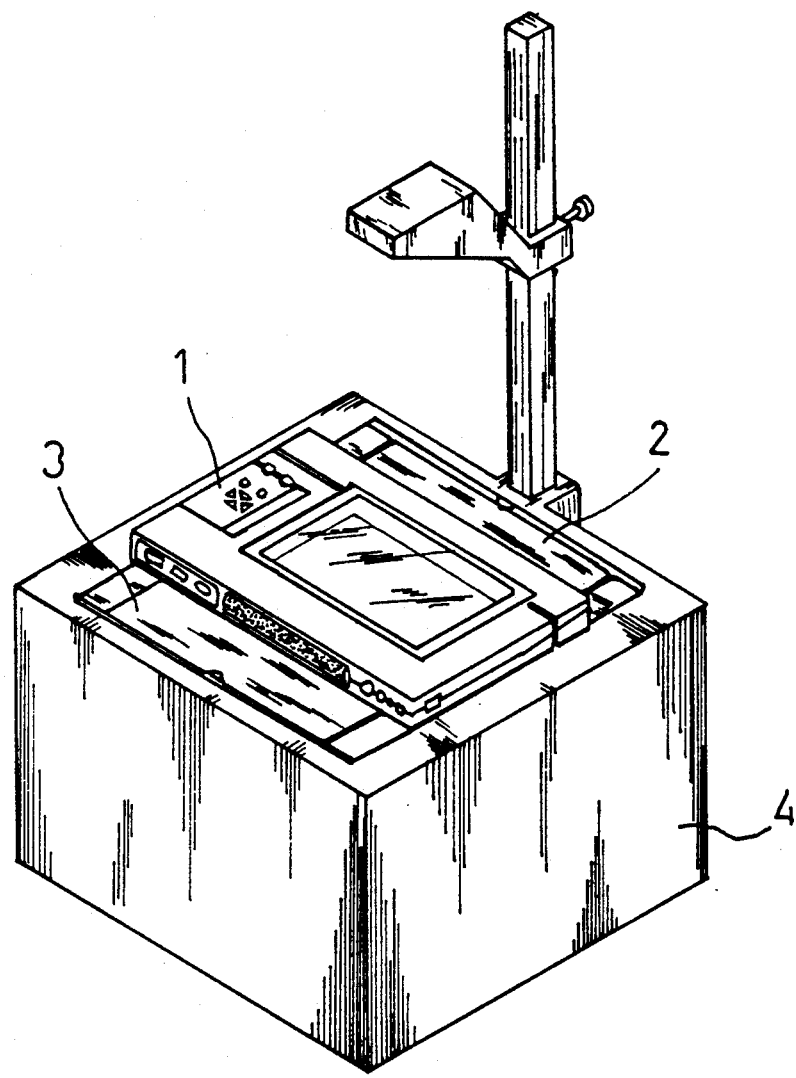
FIG. 6 is a perspective view of a projecting plate placed on a projector in accordance with the present invention concept; and, FIG. 7 is a perspective view of an embodiment of the shading device in accordance with the present invention concept.

In use, the projecting plate 1 is placed on a projecting plane 41 of a commercially available and known prior art projector 4. Light shines through the projecting plane 41 which generally is of a dimension greater than the dimension of projecting plate 1. Shading boards 2 and 3 may be slid in a longitudinal direction to cover the area of the projecting plane 41 which is not covered by the projection plate 1 as shown in FIGS. 5 and 6. Once covered, light from the projector 4 only passes through the LCD projecting plate 1. Thus, designs, letters or other indicia formed on the optical glass is projected clearly on a wall or a screen.

Figure 7:
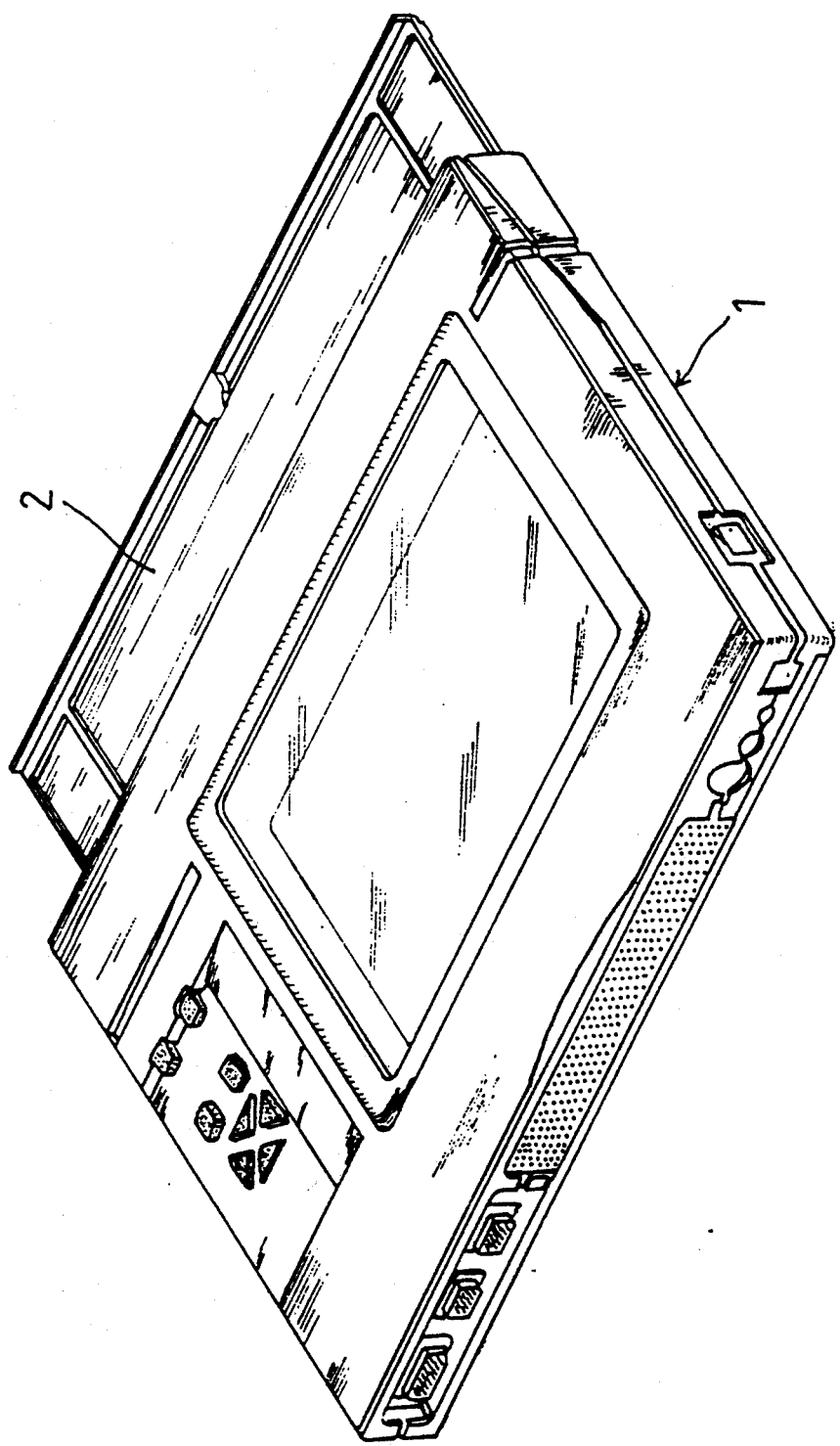

FIG. 7 shows another embodiment of the present invention which is used in a further manner to adjust the projecting position of the information. The present invention is suitable for application to any kind or size of projectors with the adjustment of the shading boards 2 and 3 being conveniently accomplished and the projecting effect being enhanced.

As various possible embodiments may be made of the above invention without departing from the scope of the invention, it is to be understood that all matter herein described or shown in the accompanying drawings is to be interpreted as illustrative and not in a limiting sense. Thus it will be appreciated that the drawings are exemplary of a preferred embodiment of this invention.

We claim:

1. A shading device for an LCD projection plate member located on a projection plane of a projector comprising:
   (a) a projection plate member having a pair of guide recesses formed within a bottom section of said projection plate member, said guide recesses extending in a longitudinal direction and being transversely displaced each from the other on opposing transverse ends of said projection plate member;
   (b) a pair of shading board members slidably insertable within said guide recesses, each of said shading board members having a pair of longitudinally directed and transversely displaced through openings for insert therethrough of respective threaded members for securement to said bottom section of said projection plate member, whereby said shading board members may be longitudinally displaced to cover said projection plane external to said LCD projection plate member.

* * * * *